Sept. 28, 1965    A. A. ZALIS ETAL    3,208,130
METHOD OF PRODUCING PISTON PACKING
Filed May 21, 1962
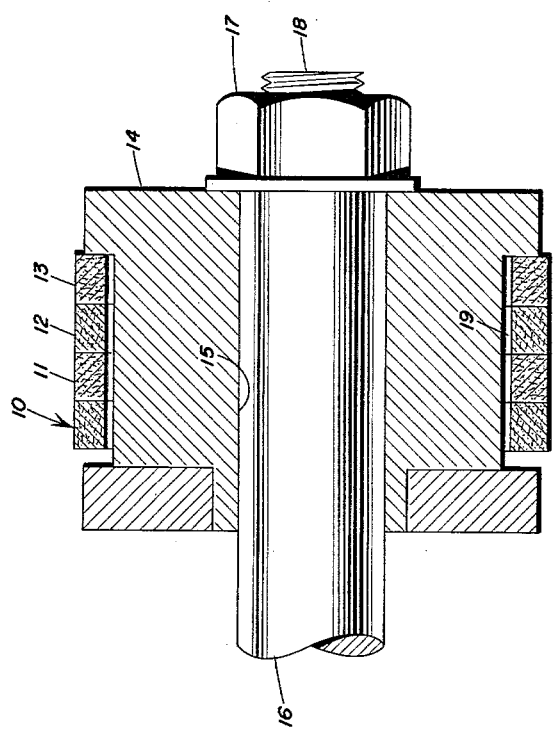
ALBERT A ZALIS
FRANK A. YOUNG
INVENTORS

United States Patent Office 3,208,130
Patented Sept. 28, 1965

3,208,130
METHOD OF PRODUCING PISTON PACKING
Albert A. Zalis and Frank A. Young, Warren, Mass., assignors to Warren Pumps, Inc., Warren, Mass., a corporation of Massachusetts
Filed May 21, 1962, Ser. No. 197,189
2 Claims. (Cl. 29—156.6)

This invention relates to a packing and method of producing the same and more particularly to a piston packing for use in handling boiler feedwater temperatures about 240° F.

In the operation of reciprocating boiler feed pumps, the pistons are provided with packing around the pistons. These pumps operate and handle boiler feed water at temperatures over 240° F. Below this temperature the packing lasts for several thousand hours, but above these temperatures 400 hours life is the average which can be expected. Since short life in the packing means frequent stopping and dismantling of the boiler feed water pumps and since steam generating units with which the pumps operate must operate continuously, it is necessary to provide a considerable number of feed water pumps to take care of the situations where at least one of them is off the line for packing replacement. These and other difficulties experienced with the prior art devices have been obviated in a novel manner by the present invention.

It is, therefore, an outstanding object of the invention to provide a piston packing capable of a long life of useful service.

Another object of this invention is the provision of a piston packing for use in a boiler feed pump of the reciprocating type which packing is capable of operating for an extremely long period of time without wearing out or deteriorating.

A further object of the present invention is the provision of a method of producing a piston packing for use in pumping boiler feedwater at temperatures above 240° F., which packing is capable of extremely long life.

With these and other objects in view, as will be apparent to those skilled in the art, the invention resides in the combination of parts set forth.

Although the novel features which are believed to be characteristic of this invention will be particularly pointed out in the claims appended hereto, the invention itself as to its objects and advantages, the mode of its operation, and the manner of its organization may be better understood by referring to the following description taken in connection with the accompanying drawings forming a part thereof, in which:

FIG. 1 is a sectional view through a piston and piston rod with packing embodying the principles of the present invention, and FIG. 2 is a flow diagram showing the method of treating the packing.

Referring to FIG. 1, it can be seen that the piston packing, indicated generally by the reference numeral 10, is being used with other piston packings 11, 12, and 13 on a piston 14 of a boiler feed pump. The piston is provided with a central bore 15 through which extends a piston rod 16 which is locked in place by a nut 17 operating on a threaded portion 18 of the rod. The piston packing is mounted in a groove 19 formed in the periphery of the piston and a locking ring 21 closes the end of the groove to hold the packings in place, there being a substantial end float space provided which, in the drawing, is exaggerated, but is actually in the order of 2/10 of an inch. It is noted that the diameter of the bottom of the groove 19 is slightly smaller than the apertures through the packings 10, 11, 12, and 13 so that there is freedom for play in the radial direction also. The piston packing 10 is formed of especially treated cotton duck fibre binder impregnated with a phenolic resin plastic material. This type of material is marketed under many trade names such as SEARO, FRANCE, and MICARTA.

Referring to FIG. 2, the packing 10 is, first of all, subjected to a swelling operation. This is accomplished by placing it in a pressure-type chamber into which is introduced live steam. The pressure in the chamber is maintained above 80 p.s.i.g. in order to maintain a temperature of 300° F. in the packing. The packing is held at this temperature for a period of 24 hours.

After the swelling operation, the packing is measured and is then machined to the correct dimensions. It is then subjected to a coating operation in which it is liberally coated with a fine powder of molybdenum disulphide. After being so coated the packing is subjected to a final treatment. It is placed in a chamber containing a bath of 120 VIEP oil fortified with 5% molybdenum disulphide. The chamber and bath is sealed and heated to a temperature of 300° F. and a pressure of 400 p.s.i.g. It is maintained at these conditions for a period 24 hours, after arriving at the 300° F. temperature.

The packing is then removed from the bath, carefully checked, coated with molybdenum disulphide again, and is ready for use.

Experience has shown that, when a packing formed in this manner is used in a boiler feed pump operating above 240° F., the life is at least 2,000 hours, which indicates that the packing has a life approximately 5 times that previously experienced with the prior art boiler feed piston packings.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent, is:

1. A method of imparting long-wearing characteristics to a piston packing formed of a cotton fiber impregnated with a phenolic resin, comprising the steps of subjecting the packing to a swelling operation in a pressure chamber for a period of a day at around 300° F. and about 80 p.s.i.g., machining the packing to size, and finally subjecting the packing to treatment in a bath of oil fortified with molybdenum disulphide for a period of a day at a temperature of around 300° F. and a pressure of about 400 p.s.i.g.

2. A method of imparting long-wearing characteristics to a piston packing formed of a cotton duck fiber binder impregnated with a phenolic resin plastic material, comprising the steps of subjecting the packing to a swelling operation in a pressure chamber containing live steam for a period of 24 hours at 300° F. and 80 p.s.i.g., machining the packing to size, coating the packing with a fine molybdenum disulphide powder, and finally subjecting the packing to treatment in a bath of oil fortified with 5% molybdenum disulphide for a period of 24 hours at a temperature of 300° F. and a pressure of 400 p.s.i.g.

References Cited by the Examiner

UNITED STATES PATENTS

| | | | |
|---|---|---|---|
| 1,012,030 | 12/11 | Underwood | 277—227 X |
| 1,673,797 | 6/28 | Brown | 277—227 X |
| 2,397,618 | 4/46 | O'Connor. | |
| 2,984,895 | 5/61 | Griffin et al. | 29—156.5 X |
| 3,093,891 | 6/63 | Karlgaard | 29—156.5 |

FOREIGN PATENTS 727,973   4/55   Great Britain.

WHITMORE A. WILTZ, Primary Examiner.